United States Patent [19]

Dibrell et al.

[11] Patent Number: 4,992,793
[45] Date of Patent: Feb. 12, 1991

[54] DEVICE FOR REJECTING PULSE REPEATER DECEPTION JAMMING

[75] Inventors: James F. Dibrell, Washington, D.C.; Donald L. Hendrix, Corona, Calif.

[73] Assignee: The United States of America as represented by the Secretary of the Navy, Washington, D.C.

[21] Appl. No.: 826,061

[22] Filed: May 9, 1969

[51] Int. Cl.[5] ............................................. G01S 7/36
[52] U.S. Cl. .................................................... 342/16
[58] Field of Search ...................... 343/18 E; 325/473; 307/239, 246, 247, 248, 254, 257; 342/16, 17

Primary Examiner—Gilberto Barrón, Jr.
Attorney, Agent, or Firm—Harvey Fendelman; Thomas Glenn Keough

[57] ABSTRACT

A device for rejecting pulse repeater deception jamming and post dispensed chaff jamming in pulse type tracking radars. By use of a very narrow sampling gate with appropriate thresholding delay and timing, a narrow portion of the target pulse which is in minimum coincidence with the jamming pulse is selected. This selected portion is used to construct a restored duplicate of the target pulse for tracking and display purposes.

5 Claims, 3 Drawing Sheets

4,992,793

DEVICE FOR REJECTING PULSE REPEATER DECEPTION JAMMING

STATEMENT OF GOVERNMENT INTEREST

The invention herein described may be manufactured and used by or for the Government of the United States of America for governmental purposes without the payment of any royalties thereon or therefor.

BACKGROUND OF THE INVENTION

The present invention relates to countermeasures devices and more particularly to countermeasures devices wherein a sampled portion of the target pulse is used to construct a restored duplicate of the target pulse which is devoid of jamming.

Some commonly used types of synchronized pulse jamming signals can be quite effective against conventional pulse tracking radars by introducing tracking errors, by causing break-lock, or by causing tracking of false targets. For example, chaff can cause the radar's tracking gate to transfer from the target echo to the chaff echo. Pulse repeater jamming can be designed to interfere with range tracking through range gate pull-off; to interfere with angle tracking through modulation of the repeated pulse (countdown, false scan modulation, etc.); or to interfere with both range and angle tracking simultaneously.

Both rear-dispensed chaff (dispensed by an incoming target) and repeater jamming have the weakness (from the jammer viewpoint) that there is an inherent minimum time delay between the start of the target pulse and the start of the jamming pulse. In the case of rear-dispensed chaff, the time delay between the target pulse and the chaff echo is caused by an immediate decrease in chaff velocity after it is dispensed, and by the time required for the chaff to "bloom" to an appreciable size. The chaff echo therefore does not appear until somewhat after the start of the target pulse. In the case of repeater jamming, the time delay is caused by the transit time of the intercepted radar signal through the jammer and its receiving and transmitting RF transmission lines.

While this inherent time delay between the target pulse and the jamming pulse sometimes can be quite short, it represents a difference between the target signal and the jamming signal which can be exploited by a radar receiver to reject the jamming. One method for taking advantage of the minimum delay is to use a radar with extremely good range resolution (pulse width of 0.2 $\mu$s or less). However, there are a large number of conventional tracking radars which are in use now, and which will continue to be in use for sometime, that have pulse widths greater than 0.2 $\mu$s.

Previous efforts to take advantage of the minimum delay have used "leading-edge" circuits which reject the latter portion of the target pulse together with some part of the jamming pulse. Such techniques use RC, LC, or delay line video differentiation. When delay line video differentiation is used, a sufficient part of the target pulse must be preserved undistorted for processing by the tracking and display circuits. Therefore, the differentiation time constant cannot be much less than the duration of the target pulse. These efforts have been unsuccessful in providing radars with the capability of rejecting pulse deception jamming which has a short minimum delay.

SUMMARY

The present invention provides a device for rejecting pulse deception jamming with a very short minimum delay. The invention provides for a very narrow sampling gate along with appropriate thresholding delay and timing to select a narrow portion of the target pulse which is in minimum coincidence with the jamming pulse. Information derived from this selected portion is used to construct a restored duplicate of the target pulse. Accordingly, an object of the invention is to provide a countermeasures device which can completely reject synchronized pulse jamming even when the delay between the start of the target pulse and the start of the jamming pulse is short compared to the duration of the target pulse.

Many other attendant advantages of this invention will become readily appreciated as the same becomes better understood by reference to the following detailed description when considered in connection with the accompanying drawings wherein.

Figure 1:
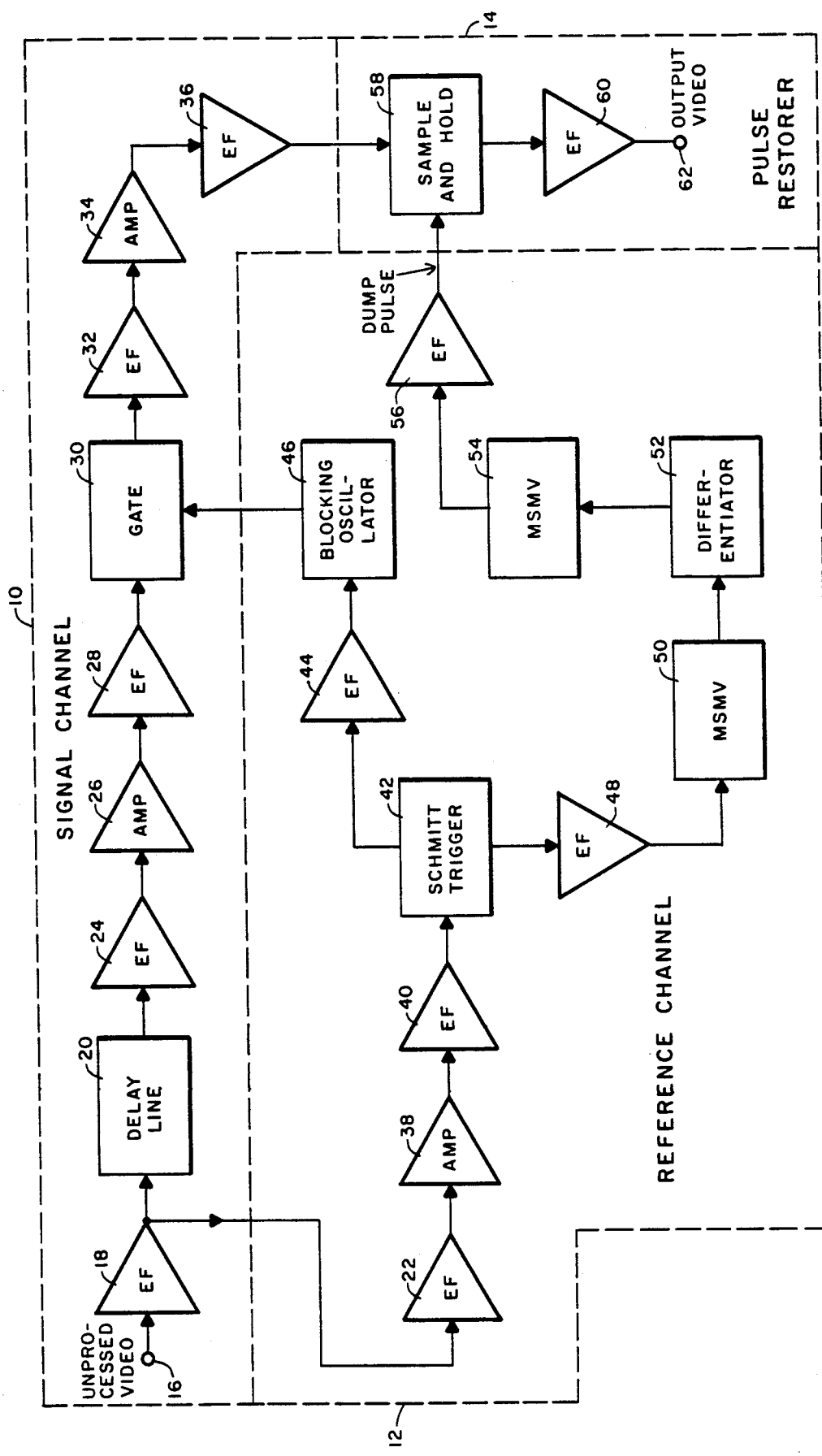
FIG. 1 is a block diagram of a preferred embodiment of the invention.

Referring to the block diagram of FIG. 1, the device is shown as being divided into three major components; a signal channel 10, a reference channel 12, and the pulse restorer 14. In the signal channel 10, the video input pulses from the radar second detector (not shown) are applied at terminal 16 to emitter follower 18. The output of emitter follower 18 is applied to a delay line 20 and also to emitter follower 22 in reference channel 12. The signal out of delay line 20 is fed through emitter follower 24 to amplifier 26 where it is amplified and fed through another emitter follower 28 to gate 30 where the extreme leading edge of the signal is gated. The output of gate 30 is fed through another emitter follower 32 and is amplified in amplifier 34 and passes through another emitter follower 36.

In the reference channel 12, the video input pulse from emitter follower 18 is fed through emitter follower 22, is amplified in amplifier 38 and is then passed through another emitter follower 40 to Schmitt trigger 42. Schmitt trigger 42 generates a pulse which is passed through an emitter follower 44 and serves as the trigger for blocking oscillator 46 which produces the gate pulse for gate 30 in the signal channel 10. The output of Schmitt trigger 42 also passes through another emitter follower 48 and is the trigger pulse for monostable multivibrator 50. Multivibrator 50 produces an output pulse which is fed to differentiator 52 where its trailing edge is differentiated and triggers another monostable multivibrator 54 which generates a dump pulse. The dump pulse is applied as one input to the sample and hold circuit 58 of pulse restorer 14 through an emitter follower 56.

In the pulse restorer channel 14, the amplified output of gate 30 is connected as another input to sample and hold circuit 58. The charging time constant of hold circuit 58 should be small so that it charges rapidly to the amplitude of the gated target pulse. When a dump pulse from reference channel 12 arrives, sample and hold circuit 58 is discharged. The resulting output from sample and hold circuit 58 is a rectangular two $\mu$s wide restored pulse which is proportional in amplitude to the input video pulse at terminal 16. The restored output pulse is passed through emitter follower 60 to output terminal 62.

Figure 2A:
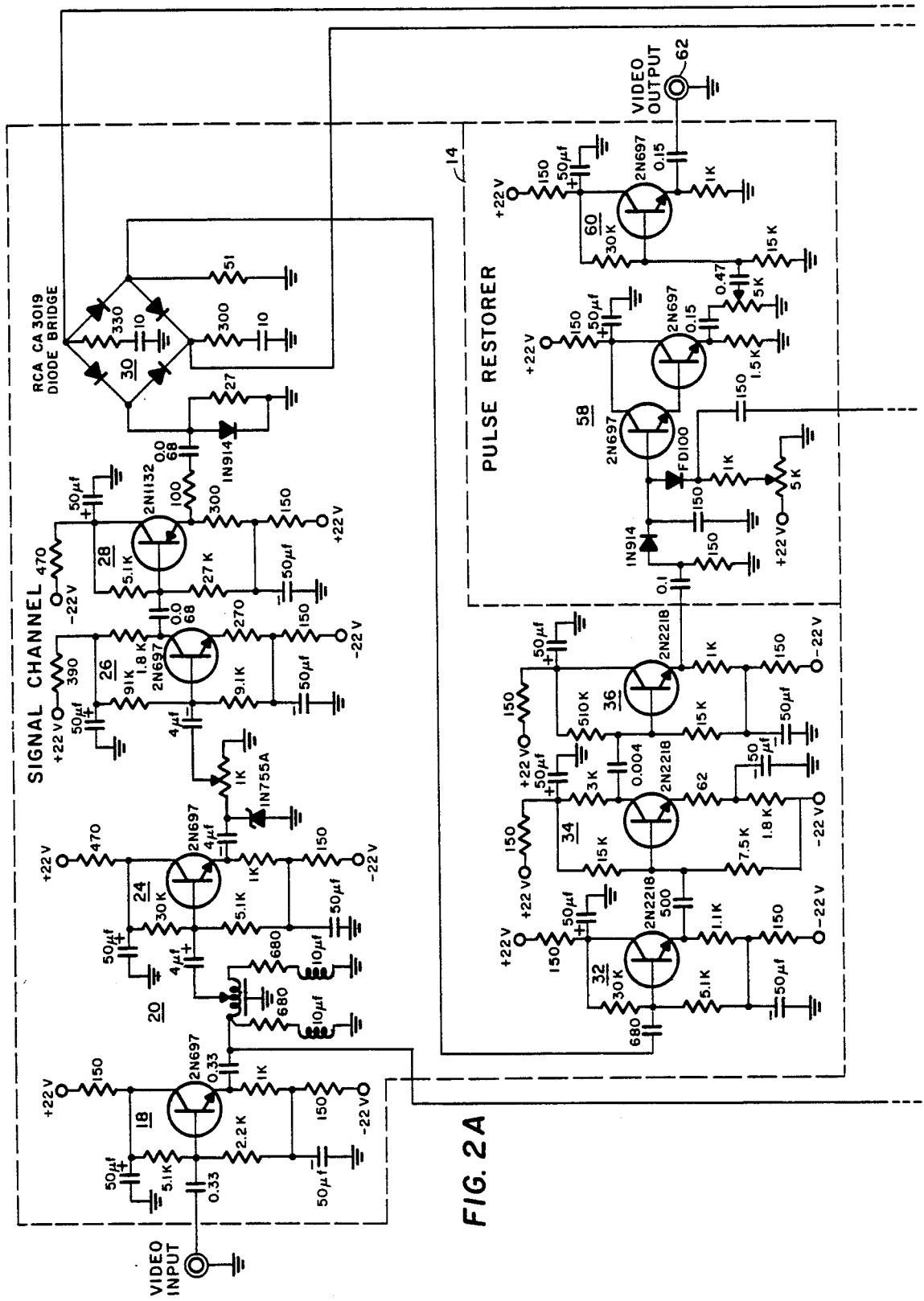
FIGS. 2A and 2B are a schematic diagram of the embodiment of FIG. 1.
Figure 2B:
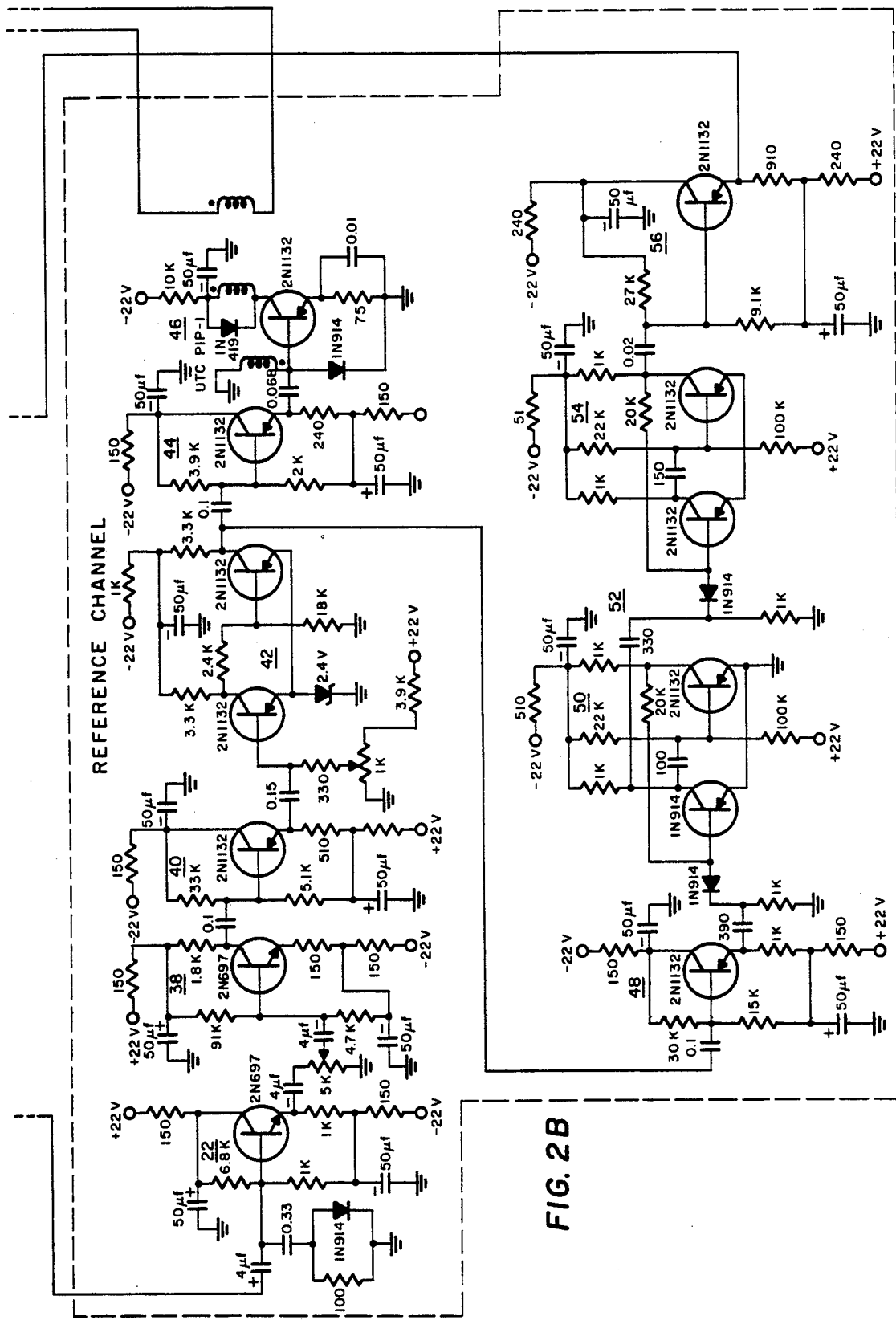

The invention of FIG. 1 is shown in FIGS. 2A,2B in schematic diagram form and with values assigned to the various components which have been found satisfactory in practicing the invention. The same reference numerals have been used to designate the same item shown in block form in FIG. 1. The circuit shown in FIGS. 2A and 2B functions in the same manner as in the above description of FIG. 1.

In operation, the video input pulses received at terminal 16 (from the radar second detector, not shown) are applied to delay line 20 and to emitter follower 22. Delay line 20 should be adjusted so that the gate pulse out of gate 30 is positioned as desired over the leading part of the target pulse. The output of gate 30 passes through emitter follower 32, amplifier 34 and emitter follower 36 to sample and hold circuit 58.

In reference channel 12, the video pulse applied to emitter follower 22, is amplified in amplifier 38 and fed through emitter follower 40 to Schmitt trigger generator 42. Schmitt trigger generator generates a pulse which is passed through an emitter follower 44 and serves as the trigger for blocking oscillator 46, which produces a 0.1 µs gate pulse to gate 30. The output of Schmitt trigger generator 42 also passes through emitter follower 48 and is the trigger pulse for monostable multivibrator 50. Multivibrator 50 produces a 2 µs pulse which is fed to differentiator 52 where its trailing edge is differentiated to produce a trigger that triggers monostable multivibrator 54 to generate a 1.7 µs dump pulse. The dump pulse is applied to sample and hold circuit 58 through emitter follower 56.

In the pulse restorer 14, the charging time constant of sample and hold circuit 58 should be small so that it charges rapidly to the amplitude of the gated target pulse. The dump pulse from reference channel 12 discharges sample and hold circuit 58 providing a relatively rectangular 2 µs wide restored pulse which is proportional in amplitude to the input video pulse. The restored output pulse is passed through emitter follower 60 to output terminal 62 where it can be fed directly to the radar video circuitry (not shown) for tracking and display.

What is claimed is:

1. In a device for rejecting pulse repeater deception jamming signals, the combination comprising:
   (a) Input circuit means for receiving video input pulses from a radar receiver,
   (b) gate circuit means having a first input coupled to said input circuit means, a second input and an output,
   (c) trigger pulse generating means having first and second outputs and an input coupled to said input circuit means for generating a pulse in response to received target pulse,
   (d) narrow gate pulse generating circuit means having an input coupled to said first output of said trigger pulse generating means and an output coupled to the second input of said gate circuit means for supplying a gate pulse to said gate circuit means in response to a trigger pulse from said trigger pulse generating means,
   (e) circuit storage means having a first input coupled to the output of said gate circuit means for receiving and holding a charge when a gate pulse is supplied to said gate circuit means by said narrow gate pulse generating circuit, a second input and an output,
   (f) discharge circuit means coupled between the second output of said trigger pulse generating means and the second input of said circuit storage means for discharging said circuit storage means in response to a trigger pulse and after a predetermined time delay to produce a restored video pulse at the output of said circuit storage means.

2. The device of claim 1 wherein said trigger pulse generating means is a Schmitt trigger generator.

3. The device of claim 1 wherein said narrow pulse generating circuit means is a blocking oscillator which produces a 0.1 µs gate pulse.

4. The device of claim 2 wherein said discharge circuit means includes a first monostable multivibrator coupled to said Schmitt trigger generator for generating an output pulse in response to a received trigger pulse, a differentiator circuit coupled to said first monostable multivibrator for differentiating the trailing edge of its output pulse, and a second monostable multivibrator coupled to said differentiator circuit and to said circuit storage means for generating a dump pulse in response to the received differentiated pulse which discharges said circuit storage means.

5. The device of claim 2 wherein said discharge means includes a first monostable multivibrator coupled to said Schmitt trigger generator for generating a 0.2 µs pulse, a differentiator circuit coupled to said first monostable multivibrator for differentiating the trailing edge of its output pulse, and a second monostable multivibrator coupled to said differentiator circuit and to said circuit storage means for generating a 1.7 µs dump pulse which discharges said circuit storage means.

* * * * *